United States Patent
Schoeters

[11] Patent Number: 5,981,953
[45] Date of Patent: Nov. 9, 1999

[54] X-RAY IMAGE DETECTOR AND READ OUT APPARATUS

[75] Inventor: Emile Schoeters, Lier, Belgium

[73] Assignee: Agfa-Gevaert N.V., Mortsel, Belgium

[21] Appl. No.: 08/985,075

[22] Filed: Dec. 4, 1997

Related U.S. Application Data

[60] Provisional application No. 60/038,764, Feb. 20, 1997.

[30] Foreign Application Priority Data

Dec. 4, 1996 [EP] European Pat. Off. ............. 96203436

[51] Int. Cl.$^6$ .................................................. G01T 1/29
[52] U.S. Cl. ........................................ 250/385.1; 250/586
[58] Field of Search ................................ 250/385.1, 584, 250/586; 313/527, 538

[56] References Cited

U.S. PATENT DOCUMENTS

| | | | |
|---|---|---|---|
| 4,953,038 | 8/1990 | Schiebel et al. | 250/584 |
| 5,223,717 | 6/1993 | Charpak | 250/385.1 |
| 5,268,569 | 12/1993 | Nelson et al. | 250/214 |

FOREIGN PATENT DOCUMENTS

| | | |
|---|---|---|
| 0142865 | of 0000 | European Pat. Off. . |
| 2668612 | of 0000 | France . |

OTHER PUBLICATIONS

"Test of a BaF$_2$—TMAE Detector for Positron–Emission Tomography" by Mine et al.; IEEE Transactions on Nuclear Science, vol. NS–34, No. 1, Feb. 1987, pp. 458–460, New York, USA, (XP002031670).

*Primary Examiner*—Edward P. Westin
*Assistant Examiner*—Richard Hanig
*Attorney, Agent, or Firm*—Baker & Botts, L.L.P.

[57] ABSTRACT

An X-ray image detector has been disclosed comprising X-ray sensitive storage means for storing an X-ray image, which storage means emit image-wise modulated light when being stimulated, and a two-dimensional position sensitive gaseous photon detector. An image stored by the detector is read by line-wise stimulation of the X-ray sensitive storage means followed by measurement of the charges generated by the gaseous photon detector.

8 Claims, 1 Drawing Sheet

X-RAY IMAGE DETECTOR AND READ OUT APPARATUS

The application claims the benefit of the U.S. Provisional Application Ser. No. 60/038,764 filed Feb. 20,1997.

FIELD OF THE INVENTION

The present invention is in the field of digital radiography. The invention more specifically relates to a new X-ray detector and to a X-ray image read out apparatus.

DESCRIPTION OF THE STATE OF THE ART

In the field of digital radiography a lot of effort has been put recently in the development of new (two-dimensional) radiation detectors (e.g. X-ray detectors) that render a digital signal representation of a radiation image.

One example, described in U.S. Pat. No. 5,331,179, is a solid state X-ray detector which comprises a conductive layer with a plurality of discrete microplates having dimensions coextensive with an image pixel. The panel further comprises a plurality of access electrodes and electronic components that are built on the panel and that allow access to the microplates for capturing and reading out a latent radiographic image stored in the panel, in the form of electric charges.

Still other types of two-dimensional X-ray detectors that provide a digital representation of a radiation image have been reported in literature.

A number of attempts have been made to develop a two-dimensional X-ray detector the operation of which is based on electron avalanche in a gaseous environment.

For example in the articles 'Characteristics of a novel X-ray detector for real-time radiographic imaging' by I. Frumkin et al., NDT & E International 1994 Vol. 27, No. 6, page 317–323 and in 'Secondary emission gaseous detectors, A new class of radiation imaging devices' by A. Breskin, Nuclear Physics B (Proc. Suppl.) 44 (1995) 351–363, a radiation detector has been described that is based on the multiplication in gas of radiation-induced photoelectrons or secondary electrons, emitted from a thin convertor.

Also in U.S. Pat. No. 5,192,861 an X-ray detector has been disclosed that operates on the basis of electron avalanche. The detector comprises a photocathode, (a) gaseous electron multiplier(s) and electron detection means. The photocathode is arranged to receive X-ray radiation and to produce an output of electrons in response to impinging X-ray radiation. At least one gaseous electron multiplier generates an avalanche of electrons in response to the output of electrons generated by the photocathode. The avalanche of electrons is then collected by means of an electron detection means such as a plurality of pad electrode assemblies.

In the above-described detector the quantum efficiency for X-ray energies above 10 keV is low because of the low absorption of the photocathode.

Further, read-out of the above-described detectors must takes place synchronously with the arrival rate of the image information.

OBJECTS OF THE INVENTION

It is a first object of the present invention to provide a new two-dimensional X-ray radiation detector that renders a digital representation of a radiation image wherein the read out rate is independent of the rate at which radiation images are captured.

It is another object of the present invention to provide a read out apparatus for reading a radiation image acquired by a such a detector.

Further objects will become apparent from the description hereafter.

STATEMENT OF THE INVENTION

The objects of the present invention are achieved by an X-ray image detector comprising a two-dimensional position-sensitive gaseous photon detector characterised in that the X-ray detector comprises an X-ray sensitive storage means (1) for storing an X-ray image, which storage means is capable of emitting image-wise modulated light, and that said two-dimensional position sensitive gaseous photon detector is arranged to detect said image-wise modulated light.

The provision of the X-ray sensitive storage means provides that the read out of the X-ray image is no longer determined by the rate at which the image information is acquired.

In the prior art, read out is for example performed by means of an array of pulse counting elements. Pulses have to be counted and measured in real time, i.e. at the rate at which they arrive at the counting elements. If this has to be performed simultaneously for all pixels, the number of pixels typically being in the order of millions of pixels, this is an extremely difficult task.

Two-dimensional gaseous position sensitive photon detectors are well known in the art. Examples are described in the article 'Applications of gaseous detectors in astrophysics, medicine and biology', by F. Sauli, published in Nuclear Instruments and Methods in Physics Research A323 (1992) 1–11 and in the above-mentioned U.S. Pat. No. 5,192,861.

A preferred two-dimensional position sensitive gaseous photon detector comprises
- a solid convertor (e.g. photocathode) arranged for receiving image-wise modulated light emitted by the storage means and being operative to provide in response to said image-wise modulated light an output of electrons,
- a gaseous electron multiplier being operative on the output of electrons from the photocathode to provide an electron avalanche comprising an increased number of electrons,
- an electrode assembly comprising at least one anode and at least one cathode, said electrode assembly being arranged to collect electrons produced by said electron multiplier.

This embodiment based on secondary emission of electrons from a solid convertor such as a photocathode, is preferred because of the high counting rates that can be achieved.

Preferably one of the electrode members, anode or cathode, comprises a number of mutually parallel elongate grid members (anode strips). This embodiment is preferred because it can easily be read out without requiring complex two-dimensional read out electronics when the grid members are connected to the read out electronics.

For the ease of explanation, in the following the anode is said to be composed of mutually parallel elongate grid members that are connected to the read out electronics.

It is to be understood, however that it is also possible to construct the cathode in the form of a number of mutually parallel elongate grid members to be connected to the read out electronics.

As will be described in more detail hereafter, the storage means can be stimulated by the light emitted by an elongate light source. Appropriate read out electronics connected to each of the anode strips can be provided for reading the charges collected by the anode strips. In this way the use of two-dimensional read-out electronics, which although feasible is complex and expensive, is avoided.

Read out of the detector proceeds as follows.

An elongate light source is positioned so that the direction into which the light source extends is perpendicular to the direction of the mutually parallel anode grid members.

The elongate light source is then transported past the storage means that have been exposed to an X-ray image, so that each line thereof is exposed to light emitted by the light source.

Image-wise modulated light emitted through the backside of the storage means impinges on the solid convertor, e.g. a photocathode and causes the photocathode to generate an output of electrons.

This output of electrons is amplified in the gaseous electron multiplier and collected by an electrode assembly.

The charges collected by the electrode assembly can then be measured by means of an electronic read out circuitry that may be external to the detector (for example a charge integrating circuitry or a photon counting circuit as will be described furtheron). The operation of the read out circuitry is arranged to measure signals at respective anode grid members in synchronisation with the movement of said elongated light source.

Another aspect of the present invention relates to an X-ray image read out apparatus comprising an elongated light source, an X-ray image detector comprising
- an X-ray sensitive storage means (1) for storing an X-ray image, which storage means emit image-wise modulated light when being stimulated,
- a two-dimensional position-sensitive gaseous photon detector having an electrode assembly (6,7) with at least one anode and one cathode whereby at least one of said anode and cathode comprises mutually parallel grid members, means (13,14) for moving said elongated light source past said detector in a direction perpendicular to said grid members, electronic read out means (8) connected to said electrode assembly and being arranged to measure signals at respective grid members in synchronisation with the movement of said elongated light source.

The above described read out method and the read out apparatus of the present invention are advantageous in that as a consequence of the fact that an electrode assembly is used that is composed of one-dimensional electrode members, the read out electronics required to read the charge collected by the electrode members, is less complex and hence also less expensive to fabricate.

In a preferred embodiment of the read out apparatus the detector further comprises
- a photocathode (4) arranged for receiving image-wise modulated light emitted by said storage means and that is operative to provide in response to said image-wise modulated light an output of electrons,
- a gaseous electron multiplier (2) being operative on the output of electrons from said photocathode to provide an electron avalanche comprising an increased number of electrons, In a preferred embodiment of both the detector and the read out apparatus, the storage means comprise a photostimulable phosphor layer emitting light of a second wavelength range upon stimulation by means of light within a first wavelength range.

This embodiment is advantageous because of the high sensitivity of such storage means to X-rays.

Other storage means might however be envisaged such as phosphors that are not stimulable, photofluorescence systems such as those described in the published European patent application 0 417 844, etc.

Examples of a stimulable phosphor employable in the radiation image storage panel of the present invention include:

SrS:Ce, Sm, SrS:Eu, Sm, ThO$_2$:Er, and La$_2$O$_2$S:Eu, Sm, as described in U.S. Pat. No. 3,859,527;

ZnS:Cu,Pb, BaO.xAl$_2$O$_3$:Eu, in which x is a number satisfying the condition of $0.8 \leq x \leq 10$, and M$^{2+}$O.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

M$^{III}$OX:xCe, in which M$^{III}$ is at least one trivalent metal selected from the group consisting of Pr, Nd, Pm, Sm, Eu, Tb, Dy, Ho, Er, Tm, Yb and Bi; X is at least one element selected from the group consisting of Cl and Br; and x is a number satisfying the condition of $0<x<0.1$, as described in Japanese Patent Provisional Publication No. 58(1983)-69281;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0<x<0.1$, as described in the above-mentioned U.S. Pat. No. 4,236,078;

(Ba$_{1-x}$,M$^{II}_x$)FX:yA, in which M$^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$ respectively, as described in U.S. Pat. No. 4,239,968.

Bariumfluorohalide phosphors as disclosed in, e.g., U.S. Pat. No. 4,239,968, DE OS 2 928 245, U.S. Pat. No. 4,261,854, U.S. Pat. No. 4,539,138, U.S. Pat. No. 4,512,911, EP 0 029 963, U.S. Pat. No. 4,336,154, U.S. Pat. No. 5,077,144, U.S. Pat. No. 4,948,696, Japanese Patent Provisional Publication No. 55(1980)-12143, Japanese Patent Provisional Publication No. 56(1981)-116777, Japanese Patent Provisional Publication No. 57(1982)-23675, U.S. Pat. No. 5,089,170, U.S. Pat. No. 4,532,071, DE OS 3 304 216, EP 0 142 734, EP 0 144 772, U.S. Pat. No. 4,587,036, U.S. Pat. No. 4,608,190, and EP 0 295 522.

Ba$_{1-x}$Sr$_x$F$_{2-a-b}$X$_b$:zA, wherein X is at least one member selected from the group consisting of Cl and I; x is in the range $0.10 \leq x \leq 0.55$; a is in the range $0.70 \leq a \leq 0.96$; b is in the range $0 \leq b < 0.15$; z is in the range $10^{-7} < z \leq 0.15$, and A is Eu$^{2+}$ or Eu$^{2+}$ together with one or more of the co-dopants selected from the group consisting of Eu$^{3+}$, Y, Tb, Ce, Tm, Dy, Pr, Ho, Nd, Yb, Er, La, Gd and Lu, and wherein fluorine is present stoichiometrically in said phosphor in a larger atom % than bromine taken alone or bromine combined with chlorine and/or iodine, as disclosed in EP 345 903.

Alkali metal phosphors comprising earth alkali metals as disclosed in e.g. U.S. Pat. No. 5,028,509 and EP 0 252 991.

Halosilicate phosphors as disclosed in, e.g., EP 304 121, EP 382 295 and EP 522 619.

The above-described stimulable phosphors are given by no means to restrict the stimulable phosphor employable in the present invention. Any other phosphor can be also employed, provided that the phosphor gives stimulated emission when excited with stimulating rays after exposure to a high energy radiation.

Still other suitable phophors are enumerated furtheron in the description.

In the preferred embodiment a photocathode is arranged for receiving light emitted by the storage means storing a radiation image upon stimulation and for generating in response to said light an output of electrons. Usable photocathodes must be highly sensitive to the wavelength of the light emitted by the storage means but must have a rather low sensitivity to the wavelength of the light used for stimulating the storage means.

Examples of photocathode materials suitable for different wavelength ranges are known to the man skilled in the art. A figure showing the spectral detectivity of optical detectors responding in the 0.2 to 1.2 micrometre range has been published in Journal of Applied Physics, Vol. 79, No. 10, May 15, 1996.

Gases usable in the context of the present invention are gases that are non-aging and that provide high gain. Typical gases that have these characteristics are a neon-dimethylether mixture, dimethylether, isobutane, $CF_4$, $CH_4$, $C_2H_6$, methylal, alcohols such as isopropanol and ethyl alcohol, and mixtures of any of the above.

At least one electrode of the electrode assembly comprises a number of mutually parallel elongate grid members in the read out apparatus and in a preferred embodiment of the detector according to the present invention. It has already been explained that this embodiment is advantageous for use in combination with an elongate light source for stimulating the X-ray sensitive storage means.

The number of strips is determined by the envisaged read out resolution and the size of the recorded image.

For example, for a 35 cm×43 cm format, the number of strips might be of the order of a few thousand in order to obtain resolutions in the order of 100 to 200 micron.

The signal corresponding with the number of electrons collected by the electrode assembly, is measured by electronic read out means that are connected to respective elements of the electrode assembly.

The read out means are arranged to measure signals at respective mutually parallel electrode grid members in synchronisation with the movement of the light source past the means for storing the X-ray image (e.g. the photostimulable phoshor layer).

The charge release is induced by the line-wise stimulation of the storage means. Appropriate synchronisation of the charge collection must be provided. The charge collection time is made to correspond to the line time, i.e. the time needed by the light source to move a distance equal to the resolution envisaged in a direction perpendicular to a stimulated line.

In one embodiment of the X-ray image read out apparatus, the electronic read out means comprise means for integrating the signal corresponding with the charges that are collected by each of the anode grid members during a period of time equal to the so-called pixel-time, i.e. the time required to stimulate a pixel of the photostimulable phosphor layer. The signal obtained by charge integration is then sampled and converted into a digital signal by means of an analog-to-digital converter.

In another embodiment the mutually parallel members of the electrode grid are connected to a corresponding pulse counting read out circuit (also called photon counting circuit).

Since the gas tube output contains a variety of noise pulses in addition to the signal pulses representing photoelectrons, simply counting of the pulses without some form of noise elimination would not result in accurate measurement.

The most effective approach to noise elimination is to investigate the height of the output pulses and for example to set a low level and a high level discriminator so that pulses smaller than the low level (which are noise pulses) and pulses higher than the upper level, are eliminated and that only pulses falling between the high and the low level are counted.

Such a pulse counting read out circuit thus comprises a discriminator that gives an output pulse of a standard shape for every input pulse that exceeds a pre-set voltage threshold and/or stays below a second threshold. The output of a discriminator is fed to a counting circuit wherein the number of pulses applied to the circuit is calculated. Examples of components that can be used in this second embodiment are known in the art and are for example described in Radiation detectors, Physical principles and applications, C. F. G. Delaney and E. C. Finch, Clarendon Press Oxford 1992, pages 249–251.

The rate at which photons have to be counted by such a photon counting circuit was investigated and was compared with the capabilities of the detector. For microgap chambers, which is an electron multiplier implementation, count rates up to $10^7$ counts/mm$^2$/sec are cited in technical literature.

The required maximum photon counting rates have been calculated for two medical applications, i.e. radiography of the thorax and mammography. Typical results are given hereafter in table 1.

TABLE 1

|  | Max dose in mR | Max dose Rx Photons/mm$^2$ | Photo-electrons/ pixel | counting time in sec (example) | average count rate electrons/ pixel/sec |
|---|---|---|---|---|---|
| thorax | 3 | $9.10^5$ | $2.10^5$ | 0.01 | $2.10^7$ |
| mammo | 240 | $2.10^7$ | $5.10^5$ | 0.01 | $5.10^7$ |

The following parameters were used in the calculation. A storage phosphor was used with a conversion efficiency such that the number of light photons/X-ray that reach the photocathode is equal to 50 for thorax and equal to 25 for mammography. The pixel area size used is $4.10^{-2}$ mm$^2$ for thorax, and $1.10^{-2}$ mm$^2$ for mammography. The quantum efficiency of the photocathode is assumed to be 10%.

It should be clear that the above calculations represent orders of magnitude. The figures depend i.a. on the selected materials, the exposure conditions etc.

From these calculations can be learnt that the counting rates fall within the performance characteristics of the existing photon counters if counting times of the order 0.01 sec or larger are used.

The calculations presume that the photons arrive at a more or less constant rate during this interval. This implies the use of stimulable phosphors which emit their light upon stimulation with a characteristic time which is of similar magnitude and preferably somewhat slower in order to avoid smearing effects.

Hence decay times $t_{1/2}$ within the approximate range 0.01 $t_{counting}$ to 0.5 $t_{counting}$ are looked for. Long $t_{1/2}$-values are feasible and even advantageous for lowering the counting rate but necessitate correspondingly longer values for $t_{counting}$.

The upper bound for $t_{counting}$ is set by the allowed total read-out time ($t_{r-o}$) for the whole detector. The read out time $t_{r-o}$ equals the number of lines multiplied by $t_{counting}$.

As the number of lines is of the order of thousand lines to guarantee adequate resolution, and practical reasons (waiting time, throughput) ask for $t_{r-o}$ shorter than say 100 s, a maximal value for $t_{counting}$ is derived which is equal to say 0,1 sec and preferably less.

Hence, taking into account considerations of both counting rate capabilities and preferred total read-out time, preferred $t_{1/2}$ values for the stimulable phosphor are obtained that are in the range 0.001 to 0.05 sec.

The above calculations support the general feasibility of the concepts. Detailed analysis of operational conditions need to be made for specific combinations of detector embodiments and application requirements.

Suitable phosphors for use in connection with the above second embodiment of the read out circuit are for example given in U.S. Pat. No. 4,239,968; EP 0 021 342; EP 0 165 987; EP 0 174 875; U.S. Pat. No. 4,806,757; EP 0 295 524; EP 0 581 066; EP 0 626 437 and in copending European patent application 96201551.

It will be clear to the man skilled in the art that the present invention is not limited to what is particularly described higher and that various alternatives might be envisaged without departing from the scope of the present invention.

BRIEF DESCRIPTION OF THE DRAWINGS

Particular embodiments of the present invention will be explained with reference to the accompanying drawings wherein.

DETAILED DESCRIPTION OF THE DRAWINGS

Figure 1:
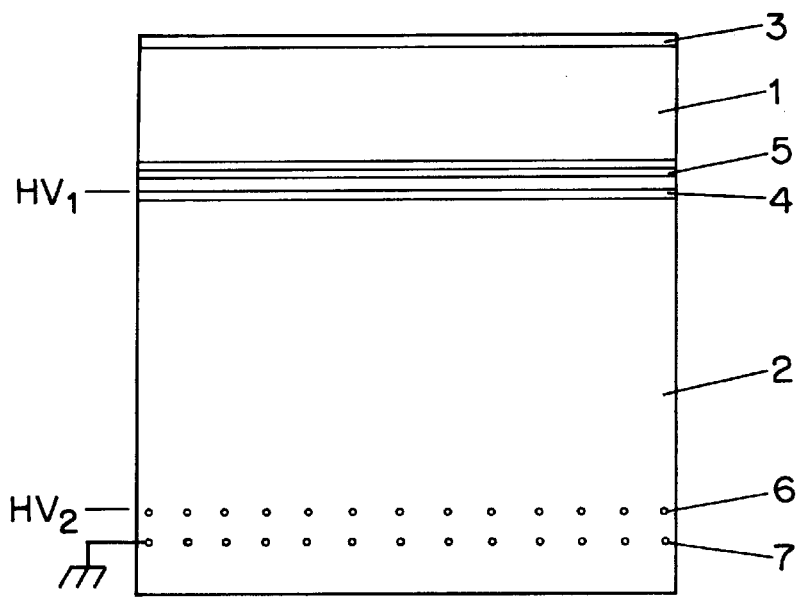
FIG. 1 illustrates a radiation detector according to the present invention.

Reference is made to FIG. 1 which illustrates an X-ray detector according to the present invention.

The x-ray detector comprises a low-pressure gas filled enclosure 2 provided with an entrance window 3.

Underneath the window a photostimulable phosphor layer 1 is provided having a thickness of about 300 micrometer. The phosphor layer consists of a $BaGd_2O_4$:Tb phosphor supported on a substrate. The phosphor has been described in European patent application 0 626 437. The phosphor has a decay time of 1 to 30 msec.

The low-pressure gas is a 50% Neon and 50% dimethyl-ether mixture. Underneath the phosphor layer a multi-alkali type photocathode 4 is provided which is highly sensitive to the wavelength of light emitted by the phosphor upon stimulation and which is rather insensitive to the wavelength of the light used for stimulating the photostimulable phosphor layer.

Measures may be taken for further optimizing separation of light within the stimulating wavelength range from light within the wavelength range of the light emitted by the phosphor upon stimulation. For example, a thin filter 5 may be provided in between the phosphor and the photocathode. Alternative measures are possible, for example the photocathode may be provided with appropriate colouring.

The detector further comprises an electrode assembly (6,7) comprising an anode grid (6) and a cathode grid (7) connected to a high voltage (HV) source (not shown). The electrode assembly is provided to collect electrons which are generated by the photocathode and by electron avalanche in the low pressure gas.

The electrode assembly in this embodiment comprises a single cathode and a single anode.

The anode comprises a number of mutually parallel anode strips. During read out (described furtheron) the detector is positioned so that the parallel anode strips extend in the direction perpendicular to the direction in which a line-wise light source is moved past the detector.

The cathode used in this embodiment is shown in FIG. 1 and also has the form of a grid. However, these cathode strips may be replaced by a cathode plane.

In another embodiment (not shown) the electrode assembly comprises a number of anode strips that are placed on top of the cathode plane and are separated from this plane by means of a thin layer of polymer typically of the order of 10 micron.

The electrode assembly is further connected to read out electronics 8. In this embodiment the read out electronics are photon counters. The number of photon counters is equal to the number of anode strips.

Figure 2:
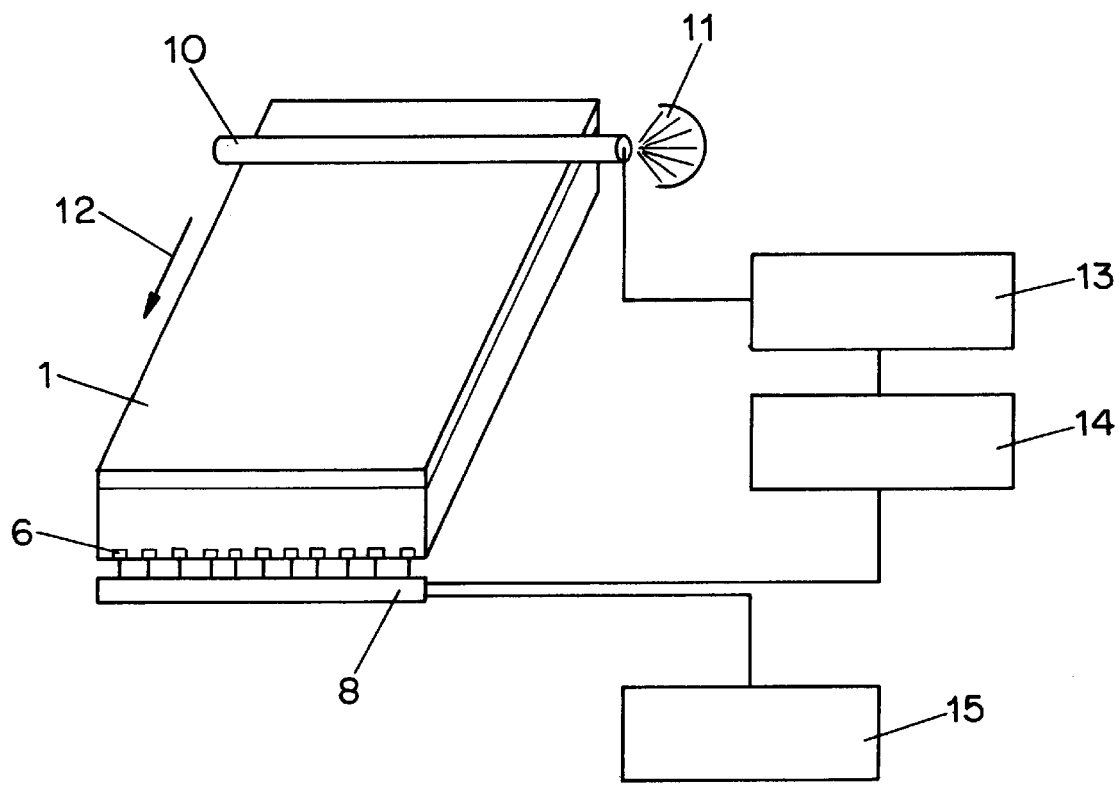
FIG. 2 illustrates a read out apparatus according to the present invention.

The read out electronics are schematically shown in FIG. 2.

When the detector of the present invention is exposed to a radiation image, the image is stored in the photostimulable phosphor layer 1 until the detector is subjected to a read out operation.

FIG. 2 shows a read out apparatus according to the present invention incorporating the detector of FIG. 1.

The photostimulable phosphor layer 1 is line-wise stimulated by means of light within the stimulation wavelength range of the phosphor.

For example, in the present case wherein a $BaGd_2O_4$:Tb phosphor is used the phosphor is stimulated by means of light within the range of 600 to 1200 nm. The wavelength range of the light emitted by the stimulation light source is filtered so that wavelengths below the photo-emission threshold of the photocathode are filtered out.

A line-wise light source (10,11) is transported along the photostimulable phosphor layer in the direction of arrow 12. The movement of the line-wise light source past the photostimulable phosphor layer is controlled by means of drive means 13 and scan control means 14.

A line-wise light source consists for example of a point-like light source 11 and an elongate light guide 10 such as a rod or a tube which has reflecting surfaces therealong and a peripheral longitudinal light-emitting outlet. An elongated slit member or a focusing device may be positioned between the elongate light guide and the phosphor. An example of such an illumination system has been described in EP 281 688.

An alternative embodiment is obtained as a combination of a point source and a bundle of optical fibres or the like which are bundled on the source side and arranged in a line at the photostimulable phosphor layer.

Light photons impinge on photocathode 4. The impingement of the photons on the photocathode 4 causes the release of electrons from the photocathode 4 at the location of the impingement. The released electrons are amplified in gaseous medium 2 to produce an electron avalanche.

The electrons produced in the avalanche are collected by electrode assembly (6,7).

The output of the anodes 6 is transmitted via conductors to read out electronics 8.

The operation of the read out electronics is synchronized with the movement of the light source 10 past the phosphor layer 1.

The output signal of the electronic read out means can be applied to a computer (15) for further processing.

After read out, the photostimulable phosphor layer is subjected to an erasure operation in order to remove any residual image left in the layer. Erasure of photostimulable phosphor screens is well known in the art and can for example be obtained by subjecting the layer to an overall illumination with light within the stimulation wavelength range. During the erasure operation the high voltage supply is turned off so as not to damage the read out electronics. The read out electronics are also subjected to a reset operation before being used to read a subsequent image.

I claim:

1. A X-ray image detector having a two-dimensional position-sensitive, gaseous photon detector comprising an X-ray sensitive storage means for storing an X-ray image, wherein said storage means is capable of emitting image-wise modulated light, and wherein said two-dimensional position-sensitive gaseous photon detector is arranged to detect said image-wise modulated light.

2. A X-ray image detector according to claim 1 wherein said two-dimensional position sensitive gaseous photon detector comprises
    a photocathode arranged for receiving said image-wise modulated light emitted by said storage means and being operative to provide in response to said image-wise modulated light an output of electrons,
    a gaseous electron multiplier being operative on the output of electrons from said photocathode to provide an electron avalanche comprising an increased number of electrons,
    an electrode assembly comprising at least one anode and at least one cathode, said electrode assembly being arranged to collect the electrons produced by said electron multiplier.

3. A detector according to claim 2 wherein at least one of said anode or cathode comprises a number of mutually parallel elongated grid members.

4. A detector according to claim 1 wherein said storage means comprise a photostimulable phosphor layer.

5. An X-ray image read out apparatus comprising
    an elongated light source,
    a X-ray image detector comprising
        X-ray sensitive storage means for storing a X-ray image, wherein said storage means is capable of emitting image-wise modulated light,
        a two-dimensional position sensitive gaseous photon detector comprising an electrode assembly having at least one anode and at least one cathode wherein at least one of said anode and cathode comprises mutually parallel grid members.
    means for moving said elongated light source past said detector in a direction perpendicular to said grid members,
    electronic read out means connected to said electrode assembly and being arranged to measure signals at said respective grid members in synchronisation with the movement of said elongated light source.

6. An X-ray image read out apparatus according to claim 5 wherein said two-dimensional position sensitive gaseous photon detector further comprises
    a photocathode arranged for receiving image-wise modulated light emitted by said storage means and being operative to provide in response to said image-wise modulated light an output of electrons,
    a gaseous electron multiplier being operative on the output of electrons from said photocathode to provide an electron avalanche comprising an increased number of electrons.

7. A read out apparatus according to claim 5 wherein said storage means comprises a photostimulable phosphor layer.

8. A read out apparatus according to claim 5 wherein said electronic read out means comprise a number of photon-counters.

* * * * *